Figure 1:
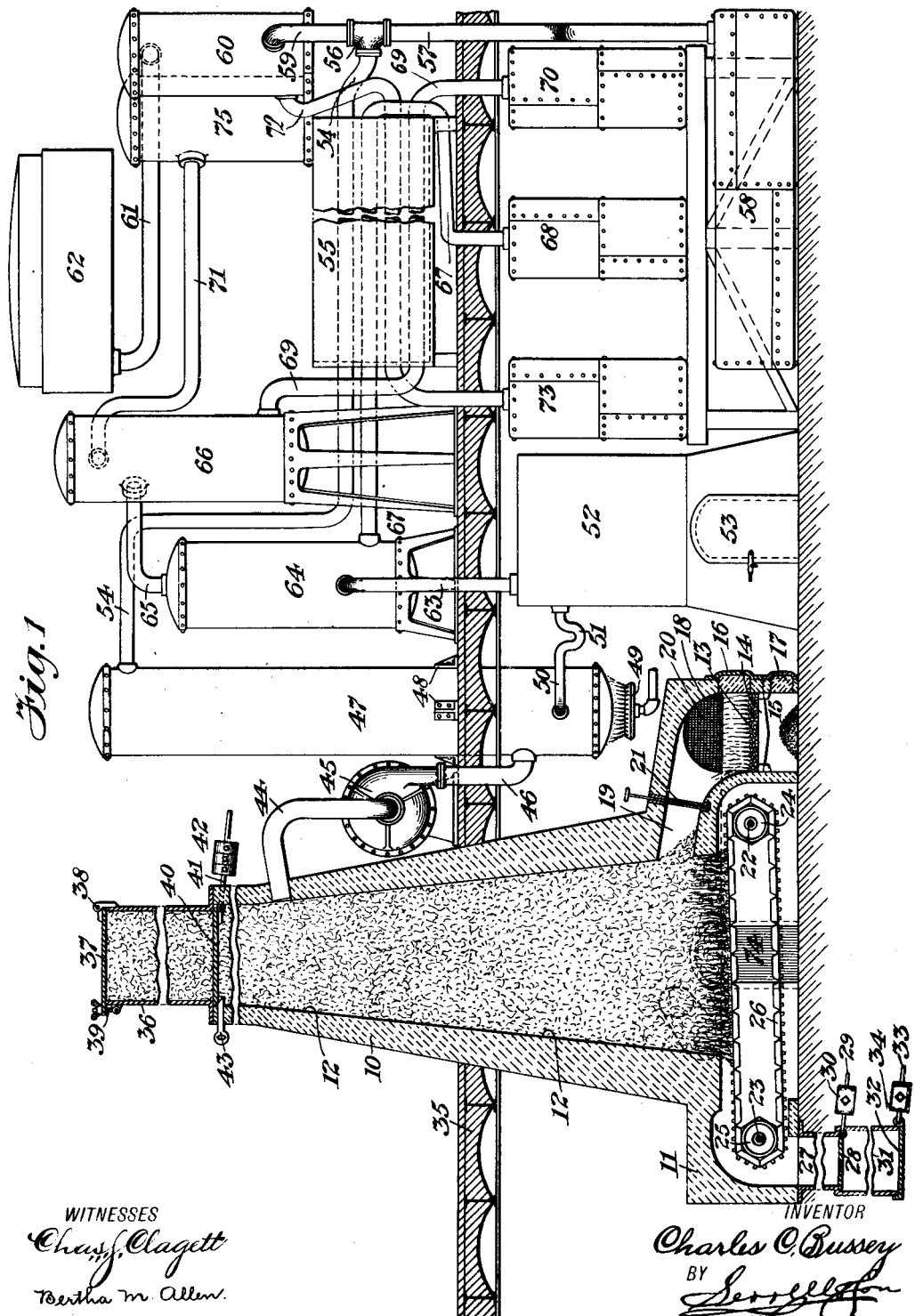

C. C. BUSSEY.
APPARATUS FOR EXTRACTING VOLATILES FROM COALS, SHALES, LIGNITE, AND SIMILAR MATERIALS AND FOR REFINING THE SAME.
APPLICATION FILED MAY 12, 1914.

1,191,870.

Patented July 18, 1916.
2 SHEETS—SHEET 1.

WITNESSES
Chas. F. Clagett
Bertha M. Allen.

INVENTOR
Charles C. Bussey
BY Serrell
HIS ATTORNEYS

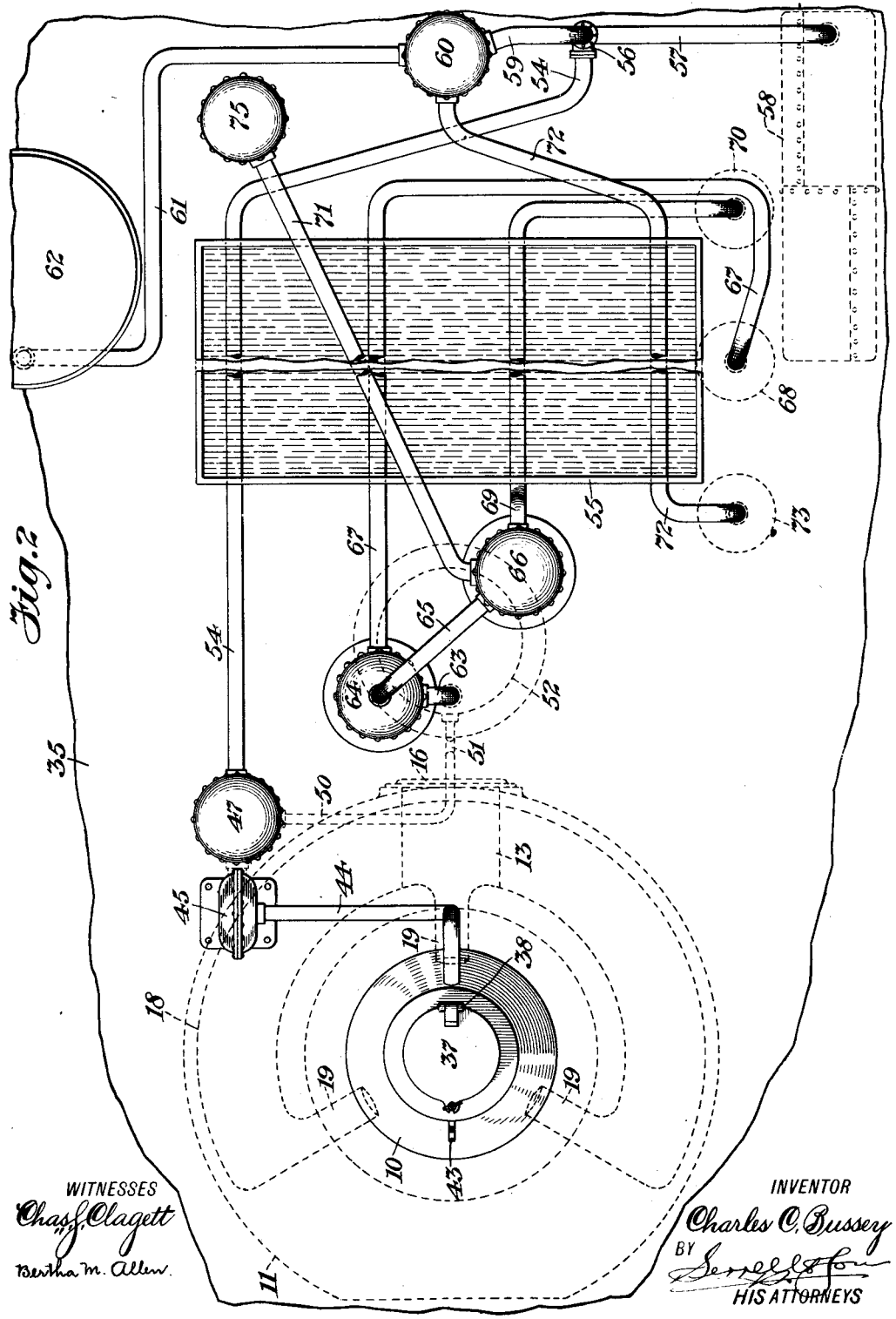

UNITED STATES PATENT OFFICE.

CHARLES C. BUSSEY, OF NEW YORK, N. Y., ASSIGNOR TO COAL BY-PRODUCTS COMPANY.

APPARATUS FOR EXTRACTING VOLATILES FROM COALS, SHALES, LIGNITES, AND SIMILAR MATERIALS AND FOR REFINING THE SAME.

1,191,870.  Specification of Letters Patent.  Patented July 18, 1916.

Application filed May 12, 1914. Serial No. 838,174.

*To all whom it may concern:*

Be it known that I, CHARLES C. BUSSEY, a citizen of the United States, residing at the borough of Brooklyn, in the county of Kings, city and State of New York, have invented an Improved Apparatus for Extracting Volatiles from Coals, Shales, Lignites, and Similar Materials and for Refining the Same, of which the following is a specification.

This invention relates to an improved apparatus for extracting volatile matters from bituminous coals, shales, lignites and other similar materials containing hydro-carbonaceous ingredients, and in carrying out the same I first generate producer gas and then pass the same, at less than a pre-determined temperature, and preferably upwardly, through a superimposed pile or body of the material from which the volatile matters are to be extracted, in order to utilize the initial heat of the producer gas to extract the volatile matters from the materials treated, so that these volatile matters, together with the producer gas, are carried away from the vessel in which the gas is preferably generated and the volatiles extracted, after which the producer gas is separated from the volatile matters and conveyed to a suitable tank or holder for utilization, and the volatile matters conveyed to a suitable depository, and, if desired, refined to any required degree.

In carrying out my improved method, I prefer to employ a retort, shaft, or cupola in which the materials to be treated are placed, and in which the producer gas is generated, and during the extraction of the volatile matters from the materials treated, these materials are preferably moved continuously and progressively through the retort, being fed into the same at the top and removed at the bottom, as coke or other residue. The temperature of the gas is so maintained within the retort as to extract the desired amount of volatiles from the materials without producing any chemical change in said materials while the volatiles are being extracted therefrom, and in order to so maintain the temperature the coke or other residue is regularly and uniformly removed at the bottom of the retort causing the materials to pass progressively therethrough in a downward direction. Furthermore, in order to effect a free and uniform expansion of the materials throughout the retort and also in order that the producer gas may be evenly distributed, I prefer to carry out my improved method under a partial vacuum, for which purpose an exhauster is employed to create this partial vacuum, and also to act as a means for removing or assisting in removing the mixed producer gas and volatile matters from the retort.

My improved method also includes the separation of the producer gas from the extracted volatiles and the refining of the latter to a required degree, as will be hereinafter more particularly described.

The method of extracting volatiles from coals, shales and like materials as herein set forth, is made the subject to the separate application filed on the same date herewith under Serial No. 838,173.

In the drawing, Figure 1 is a diagrammatic sectional elevation illustrating an apparatus by which my improved process is carried out, and Fig. 2 is a diagrammatic plan of the same.

Referring to the drawing, the apparatus which I prefer to employ preferably comprises a retort 10 built upon a suitable base 11, both of which may be made of any material and of the required dimensions. The inner walls 12 of the retort 10 are preferably inclined or tapering from the top, or a point adjacent the top, downwardly, in order to provide not only for the ready distribution of the materials to be treated but also to permit of their proper expansion while under treatment.

In any suitable position in the base 11 of the retort, I provide a fire-place, indicated at 13. This is fitted with suitable grate bars 14, beneath which there is a space, providing an ash pit 15. The fire-place is fitted with a suitable door 16 and the ash pit with a door 17. The fire-place 13 communicates with a circumferential flue 18, extending any desired distance around, within the base 11, and this flue 18 has branch flues 19, making communication between the same and the interior of the retort at the lower end thereof. In the mouth of each of the flues 19, I prefer to place a screen 20, and within each flue 19 there is a damper 21.

Within the base at the bottom of the retort, there is a space in which shafts 22 and 23 are suitably mounted. Upon the shaft 22 there are sprocket wheels 24, and on the shaft 23 there are sprocket wheels 25. Passing over these sprocket wheels is a moving grate 26, which, as will be understood, is sufficiently wide to extend entirely across the opening at the lower end of the retort.

As will be observed from the drawing, the shaft 23 is appreciably lower than the shaft 24, so that the moving grate is placed at an inclination from the shaft 22 to the shaft 23. The moving grate is preferably thus inclined in order to insure the proper removal of the coke, ash or other residue from the material being treated within the retort, as will be hereinafter more fully explained. At the left-hand end of the grate, as shown in Fig. 1, the same passes immediately over a passage-way 27, at the bottom of which there is a door 28 fitted with an arm 29 and a counter-weight 30 suitably connected thereto in order to normally hold the door in its closed position, as shown in the drawing. At the bottom of the passage-way 27, and beneath the door 28, is a coke or ash pit 31. At the bottom of the ash pit there is a door 32, which is also provided with an arm 33 and a counter-weight 34, in order to normally maintain this door in a closed position, as is also shown in the drawing.

The base of the retort preferably rests upon a suitable foundation, and the walls of the retort proper pass through a floor 35, so that a portion of the apparatus is below the floor and a portion thereof above the floor. At its upper end, the retort 10 is provided with a hopper 36 at the top of which there is a door 37 hinged or otherwise connected thereto, as indicated at 38. This door is normally maintained closed by a bolt 39 provided with a thumb screw. At the bottom of the hopper and at the top of the retort, there is another door, indicated at 40. This door is suitably hinged to the hopper and is provided with an arm 41 and a counter-weight 42, in order to normally maintain it in a closed position, in which position it may be secured by a lock bolt 43 or otherwise. At a point in the upper end of the retort, adjacent the top thereof, the same is provided with an opening adapted to receive one end of a discharge pipe 44, the opposite end of which is suitably connected to the suction side of an exhauster 45. The discharge side of this exhauster is connected by the pipe 46, preferably extending through the floor 35 and leading to the lower end of a separator 47. This separator also preferably extends through the floor 35 and is supported thereon by means of brackets 48 or otherwise. For a purpose to be hereinafter explained, this separator 47 may be provided with a gas burner 49, or other suitable means for heating the contents of the separator. The lower end of the separator 47 is connected to an auxiliary retort or still 52, by means of a pipe 50, in which there is a trap or U-bend 51. The auxiliary retort 52 is provided with a fire door 53, and interiorly with suitable means for heating the contents of the retort, the door 53 being employed to provide access to the means for heating this member of the apparatus.

A pipe 54 is suitably secured at one end in the upper portion of the separator 47. This pipe 54 is passed through a suitable condenser 55, preferably comprising a tank in which water is constantly circulated, and after passing through the condenser is connected to a T 56. The pipe 57 is secured at one end to the T 56 and at the other to an oil or residue tank 58. The pipe 59 connects the opposite side of the T 56 with an auxiliary separator 60, the upper portion of which is connected to a gas tank 62 by a pipe 61. The auxiliary retort or still 52 is connected to the lower portion of an auxiliary separator 64 by means of a pipe 63, and the pipe 65 extends from the upper end of the auxiliary separator 64 to an auxiliary separator 66. The pipe 67 leads from the lower end of the auxiliary separator 64 through the condenser 55, and terminates in an oil tank 68, and similarly a pipe 69 extends from the lower end of the auxiliary separator 66 through the condenser 55 and terminates in an oil tank 70. The upper end of the auxiliary separator 66 may be connected to a tank or other receptacle 75, and this series of auxiliary separators and tanks continued indefinitely, depending upon the degree to which it is desired to refine the product. The lower end of the auxiliary separator 60 is connected by a pipe 72 with a tank 73.

In the use of the hereinbefore described apparatus, the bituminous coals, shales, lignites or other similar materials having hydro-carbonaceous ingredients, and from which it is desired to extract the volatile matters, are placed in the retort 10, completely filling the chamber therein, after provision has been made for suitably heating the same.

In the use of bituminous coal, the fires may be started immediately upon the moving grate 26, access being had thereto for this purpose through a suitable fire door 74, the bituminous material being sufficiently combustible to provide the necessary producer gas for extracting the volatile matters from the material in the upper portion of the retort, as it passes through the same. It will be understood that the material may be placed within and the residue removed from the retort without opening the interior thereof to the atmosphere, the material being admitted through the hopper 36 by operating the upper and then the lower door, and the coke, ash or other residue being withdrawn or removed by a traveling grate 26, which progressively removes the coke, ash or other residue and permits the same to fall into the passageway 27, from which it may be emptied into the pit 31 through the door 28 and removed through the door 32. It will be further understood that the movement of the grate is such as to so control the fires that the temperature of the resultant producer gas will not exceed approximately 800° Fahr., which has been determined by experiment as necessary in obtaining the best results in the practise of my invention. The traveling grate 26 is placed at an inclination so as to provide adequate space between the same and the lower wall of the retort on the side at which the residue is removed.

In the use of shales, lignites and other similar materials, which are not sufficiently combustible to produce the necessary gas for extracting the volatile matters from the material under treatment, it is necessary to provide some means for independently generating the necessary gas to effect the extraction of these volatile matters. It is for this purpose that I provide the base of the retort with the fire-place 13 and the flues 18 and 19, so that in extracting volatile matters from these substances, anthracite coal or other suitable material may be burned in this fire-place and the resultant producer gas passed through the flues and into the retort, the dampers 21 or other suitable fire-regulating means being operated to maintain the temperature of the gas at approximately 800° Fahr., as hereinbefore stated.

In extracting the volatile matters from bituminous coal, the coke or other residue is progressively removed at the bottom of the retort and the fire in the material restricted to that portion thereof in the bottom of the retort, so that the producer gas generated passes up through the coal above the fire and is uniformly distributed therethrough and is thus employed to extract volatile matters therein. These volatile matters, mixed with the producer gas, are then withdrawn from the retort by the exhauster 45, passing through the pipes 44 and 46 into the separator 47, where, as will be understood, the gases and perhaps a small percentage of the lighter volatile matters will rise to the top of the separator and pass through the pipe 54 through the condenser 55, during which passage the lighter volatile matters are condensed and passed to the tank 58 by way of the pipe 57, the gases passing by way of the pipe 59 to the auxiliary separator 60 and thence to the gas tank 62, by way of the pipe 61. If, for any reason, all of the lighter volatile matters should not be condensed in the pipe 54, as the same passes through the condenser, these uncondensed volatile matters will settle in the bottom of the auxiliary separator 60, and pass by way of the pipe 72 to the tank 73. The heavier volatile matters, as it will be understood, settle in the bottom of the separator 47, and are trapped into the auxiliary retort or still 52 by the pipe 50. The gas burner 49, or other similar heating apparatus, may be utilized, as it will be understood, if, for any reason, the temperature of the mixture of volatile matters and producer gas is reduced below a certain point before being admitted to the separator 47.

After the heavier volatile matters have reached the auxiliary retort or still 52, they may be heated therein by any suitable heating apparatus, so that the vapors pass from the retort or still through the pipe 63 into the auxiliary separator 64, where the lighter portion of these vapors, as will be understood, passes through the pipe 65 into the auxiliary separator 66. The heavier portions of these vapors fall to the bottom of the auxiliary separator 64 and pass, by way of the pipe 67, through the condenser 55 to the tank 68. Similarly, the lighter vapors, after the same have reached the auxiliary separator 66, rise to the top thereof and pass by way of the pipe 71, to a suitable receptacle, and the heavier portions of the vapor in the auxiliary separator 66 pass by way of the pipe 69 through the condenser 55 and the tank 70, it being understood that while I have shown a series of two auxiliary separators, namely 64 and 66, for the refining of the heavier volatiles, any number of the same may be employed or similarly connected in order that the products may be refined to any desired degree. It will be furthermore understood that the process of refining the products is precisely the same in the treatment of shales, lignites and other materials, as that hereinbefore described in connection with the treatment of bituminous coals.

I claim as my invention:

1. An apparatus for extracting volatile matters from materials having hydrocarbonaceous ingredients comprising a retort of sufficient length to provide a relatively deep bed of material, means at the top of the retort for admitting material to be treated therein, and an endless conveyer placed at an angle to the horizontal beneath the retort to continuously withdraw laterally at all points from the bottom of the retort, an equal amount of the residue from the material under treatment.

2. An apparatus for extracting volatile matters from materials having hydrocarbonaceous ingredients comprising a conical retort of sufficient length to provide a relatively deep bed of material, means for admitting material to be treated at the top of the retort, an endless conveyer placed at an angle to the horizontal beneath the bottom of the retort so as to continuously withdraw at all points across the bottom of the retort an equal amount of the residue from the material under treatment, and means for withdrawing the mixed gases and volatiles from the retort at the upper end thereof.

3. An apparatus for extracting volatile matters from materials having hydrocarbonaceous ingredients comprising a conical retort of sufficient length to provide a relatively deep bed of material, a hopper at the top of the retort through which the material to be treated therein is admitted, an endless conveyer placed at an angle to the horizontal beneath the bottom of the retort so as to continuously withdraw at all points across the bottom of the retort an equal amount of the residue from the material under treatment, and means for withdrawing the mixed gases and volatiles from the retort at the upper end thereof.

4. An apparatus for extracting volatile matters from materials having hydrocarbonaceous ingredients, comprising a base, a conical retort mounted thereon and of sufficient length to provide a relatively deep bed of material, fireplaces in spaced positions in the said base in which there is a circumferential flue and flues leading therefrom to the said retort, a hopper at the top of the retort for admitting the material to be treated therein, and an endless conveyer inclined to the horizontal and extending beneath the bottom of the retort so as to withdraw at all points across the bottom of the retort an equal amount of the residue from the material under treatment in the retort, and means for withdrawing the mixed gases and volatiles from the upper end of the retort.

5. An apparatus for extracting volatile matters from material having hydrocarbonaceous ingredients, comprising a base, a conical retort mounted thereon and of sufficient length to provide a relatively deep bed of material, fireplaces in spaced positions in the said base in which there is a circumferential flue and flues leading therefrom to the said retort, dampers in said flues, a hopper at the top of the retort for admitting the material to be treated therein, and an endless conveyer so inclined to the horizontal and extending beneath the bottom of the retort as to withdraw at all points across the bottom of the retort an equal amount of the residue from the material under treatment in the retort, means for withdrawing the mixed gases and volatiles from the upper end of the retort, and devices for separating the said gases and volatiles after the same have been withdrawn from the upper end of the retort.

Signed by me this 6th day of May, 1914.

CHARLES C. BUSSEY.

Witnesses:
 BERTHA M. ALLEN,
 J. B. LE BLANC.